United States Patent
Gopinath et al.

(10) Patent No.: US 11,402,624 B2
(45) Date of Patent: Aug. 2, 2022

(54) OPTICAL SHUTTERS HAVING OFFSET LIQUID LENSES

(71) Applicant: The Regents of the University of Colorado, a body corporate, Denver, CO (US)

(72) Inventors: Juliet T. Gopinath, Boulder, CO (US); Victor M. Bright, Boulder, CO (US); Andrew M. Jones, Issaquah, NY (US)

(73) Assignee: Regents of the University of Colorado, Denver, CO (US)

( * ) Notice: Subject to any disclaimer, the term of this patent is extended or adjusted under 35 U.S.C. 154(b) by 0 days.

(21) Appl. No.: 16/789,704

(22) Filed: Feb. 13, 2020

(65) Prior Publication Data

US 2020/0183147 A1 Jun. 11, 2020

Related U.S. Application Data

(62) Division of application No. 15/449,975, filed on Mar. 5, 2017, now Pat. No. 10,598,919.

(60) Provisional application No. 62/310,310, filed on Mar. 18, 2016, provisional application No. 62/303,589, filed on Mar. 4, 2016.

(51) Int. Cl.
| | |
|---|---|
| *G02B 26/00* | (2006.01) |
| *G02B 26/08* | (2006.01) |
| *G02B 26/02* | (2006.01) |
| *G02B 3/12* | (2006.01) |

(52) U.S. Cl.
CPC ............ *G02B 26/005* (2013.01); *G02B 3/12* (2013.01); *G02B 26/02* (2013.01); *G02B 26/0816* (2013.01)

(58) Field of Classification Search
CPC .. G02B 26/005; G02B 26/0816; G02B 26/02; G02B 3/12; G02B 2207/115; G02B 3/14; G02B 26/004; G02B 26/00; G02B 26/08; G02B 26/0833; G02B 6/0043;
(Continued)

(56) References Cited

U.S. PATENT DOCUMENTS

| | | | |
|---|---|---|---|
| 7,324,287 B1 * | 1/2008 | Gollier | G02B 3/14 359/665 |
| 10,598,919 B2 | 3/2020 | Gopinath | |

(Continued)

OTHER PUBLICATIONS

Lee et al., Variable-focus Liquid Lens Based on a Laterally-integrated Thermopneumatic Actuactor, Mar. 1, 2012, Journal of the Optical Society of Korea, vol. 16, No. 1, pp. 22-28 (Year: 2012).*

(Continued)

*Primary Examiner* — Ephrem Z Mebrahtu
(74) *Attorney, Agent, or Firm* — Macheledt Bales LLP; Jennifer L. Bales

(57) ABSTRACT

Electrowetting-actuated optical shutters based on total internal reflection or beam steering. An electrowetting cell contains a conducting liquid and a non-conducting liquid configured to form a liquid-liquid interface extending to the inner walls of the cell. A beam of light is directed to the liquid-liquid interface at an angle near the total internal reflection angle of the interface. Voltage changes the shape of the liquid-liquid interface, without separating it from the inner walls of the cell. Thus, when depending on the voltage applied, the beam is either transmitted in part or substantially totally internal reflected.

13 Claims, 5 Drawing Sheets

(58) Field of Classification Search
CPC .... G02B 6/3524; G02B 5/24; G02B 26/0841; G02B 27/0172; G02F 1/315
See application file for complete search history.

(56) References Cited

U.S. PATENT DOCUMENTS

| | | | | |
|---|---|---|---|---|
| 2008/0100905 | A1* | 5/2008 | Kato | G11B 7/13925 359/295 |
| 2009/0141352 | A1* | 6/2009 | Jannard | G02B 26/004 359/557 |
| 2012/0050881 | A1* | 3/2012 | Yamazaki | G02B 26/005 359/666 |
| 2012/0228475 | A1* | 9/2012 | Pang | G02B 5/1842 250/208.1 |
| 2014/0063055 | A1* | 3/2014 | Osterhout | G06F 3/165 345/633 |

OTHER PUBLICATIONS

Liu et al., An electrowetting-actuated optical switch based on total internal reflection, Applied Optics vol. 54, Issue 10, Apr. 2015.
Zohrabi et al., Wide-angle nonmechanical beam steering using liquid lenses, Optics Express vol. 24, No. 21, Oct. 2016.
Montoya et al., Large extinction ratio optical electrowetting shutter, Optics Express vol. 24, No. 9, Apr. 2016.
Terrab et al., Adaptive electrowetting lens-prism element, Optics Express vol. 23, No. 20, Sep. 2015.
Watson et al., Focus-tunable low-power electrowetting lenses with thin parylene films, Applied Optics vol. 54, No. 20, Jul. 2015.

* cited by examiner

OPTICAL SHUTTERS HAVING OFFSET LIQUID LENSES

BACKGROUND OF THE INVENTION

Field of the Invention

The present invention relates to optical shutters. In particular, the present invention relates to electrowetting optical shutters based on total internal reflection (TIR) or angular beam steering.

Discussion of Related Art

Optical shutters are used in many applications such as atomic clocks, communications, lab-on-a-chip devices, and optical displays. Existing technologies typically utilize integrated lithium-niobate electro-optic modulators, acousto-optic modulators, or mechanical methods based on blades or diaphragms. However, integrated modulators suffer from limited aperture and contrast ratio, acousto-optic modulators are constrained in their extinction ratio by scattering, and mechanical methods are prone to friction issues and long term wear. Liquid-based electrowetting optical devices provide an attractive alternative for applications requiring large extinction ratios and apertures with no moving mechanical parts.

Although there are previous demonstrations of electrowetting-based displays, tunable irises, and switches, high extinction ratio (beyond 30 dB) shutters have not been demonstrated. There are many implementations of these functionalities, using opaque ink or oil droplets, tunable irises, and liquid interfaces operating around total internal reflection (TIR). The device using TIR uses a droplet in an enclosed box which spreads and contracts over a floor. This device is slow and achieves only modest extinction ratios.

A need remains in the art for electrowetting-actuated optical shutters with improved extinction ratios.

SUMMARY OF THE INVENTION

It is an object of the present invention to provide methods and apparatus for electrowetting-actuated optical shutters with improved extinction ratios. Embodiments of the present invention include large extinction ratio optical shutters using electrowetting liquids based on switching between a liquid-liquid interface curvature that produces total internal reflection and one that does not. Other embodiments angularly steer a beam transmitted through the shutter so that the output beam is transmitted or rejected based upon the angle of the output beam.

The present invention achieves greater than 60 dB extinction ratios with electrowetting shutters owing to its minimal interface roughness and unique geometry. The liquid-liquid interfaces of the present invention are particularly useful thanks to their well-defined interfaces, angstrom level surface roughness, optical isotropy, and low optical loss. The electrowetting effect enables transmissive, compact devices requiring minimal voltages and no moving mechanical parts.

An embodiment of the present invention comprises a device utilizing the electrowetting effect to control the shape of a conducting liquid droplet, or interface between a polar and non-polar liquid. The shutter is based on an electrowetting liquid interface switching between total internal reflection and transmission, or angular steering.

DETAILED DESCRIPTION OF THE INVENTION

Figure 1:
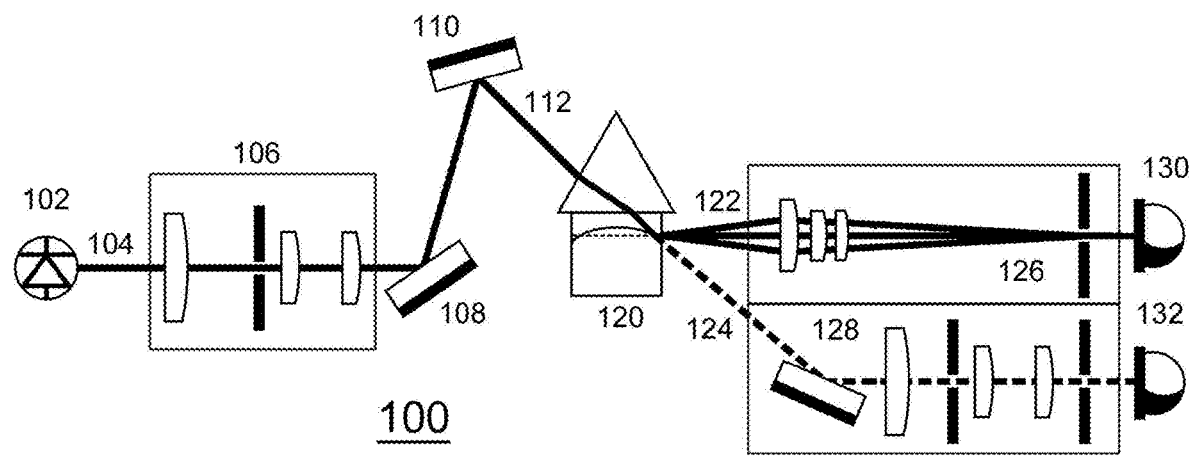
FIG. 1 is a schematic block diagram of an optical shutter system according to the present invention.

FIG. 1 is a schematic block diagram of an embodiment of an optical shutter system 100 according to the present invention. This embodiment is an experimental setup for measuring extinction ratio and response time of shutter 120. The 780 nm laser diode 102 generates beam 104. Beam 104 is spatially filtered and focused by optics 106 to optimize spot size incident on the liquid-liquid interface 220 of shutter 120 (see FIG. 2). The correct angle of incidence in this embodiment is achieved using a pair of mirrors 108, 110. Transmitted beam 124 and totally internally reflected beam 122 are then passed through respective spatial filters 126, 128 to photodetectors 130, 132.

In this embodiment, laser diode beam 104 is spatially filtered and focused to a 250 µm diameter spot on liquid interface 220, offset from the center of the device by 2-3 mm to optimize the incident light position for switching between transmission and total internal reflection. In the case of transmitted beam 124, the output light is collimated and focused through optics 128 including two spatial filters of pinhole diameters of 100 and 75 m. For totally internally reflected beam 122, one 200 µm pinhole 126 is used. Spatial filters were selected to provide maximum extinction ratio for both the transmitted and internally reflected states.

Figure 2:
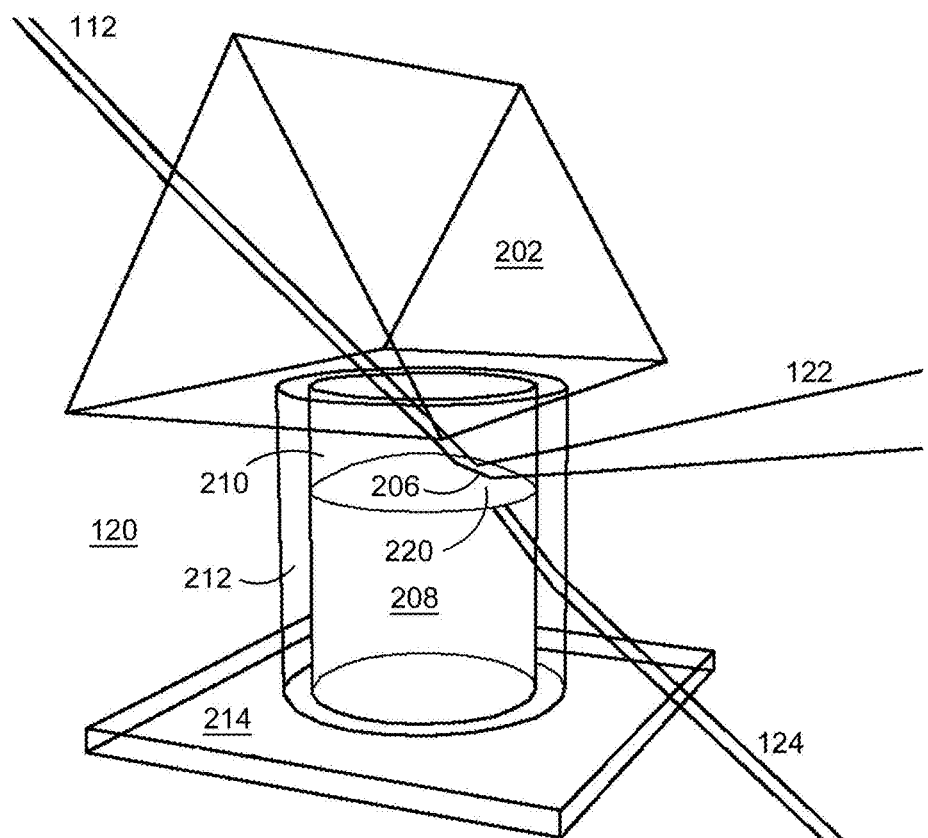
FIG. 2 is a side isometric view of an embodiment of an optical shutter according to the present invention.

FIG. 2 is a side isometric view of an embodiment of optical shutter 120. Optical shutter 120 is based on the principle of electrowetting, in which the contact angle and shape of a liquid droplet or interface 220 is controlled with an applied voltage (see FIG. 3). In this design, the curvature of liquid-liquid interface 220 allows the device to switch between total internal reflection 122 and transmission 124. Shutter 120 comprises a sealed glass cylinder 212 attached to base 214 that is filled with two liquids, dodecane oil 210 and water 208, and a prism 202 to couple in the incident light 112 at the correct angle. This combination of liquids is fairly well density matched and operates well at visible to 1000 nm wavelengths. Using propylene glycol and oil extend the range to 1550 nm. Beyond that would generally require ionic liquids or reflective surfaces. Those skilled in the art will appreciate that many combinations of fluids could be used depending upon what results are desired. Some examples are given in Appendix A.

The sidewall of cylinder 212 has a thin film electrode followed by a dielectric layer and a hydrophobic coating (see FIG. 4). At 0 V, incoming light strikes liquid interface 220 at approximately 72°, 4 degrees beyond the water-oil TIR critical angle of 68°, relative to the surface normal. Electrically tuning the interface curvature causes incident light at an appropriate angle and offset from the center to cross this critical angle and switch between total internal reflection and transmission states.

This embodiment implements the electrowetting shutter 120 using a design that enables tuning of the curvature of an interface 220 between a polar liquid 208 (here water with 1% sodium dodecyl sulfate) and a non-polar liquid 210 (dodecane oil). By changing the applied voltage, the interface radius can switch from 9 mm to −45 mm.

Figures 3A, 3B:
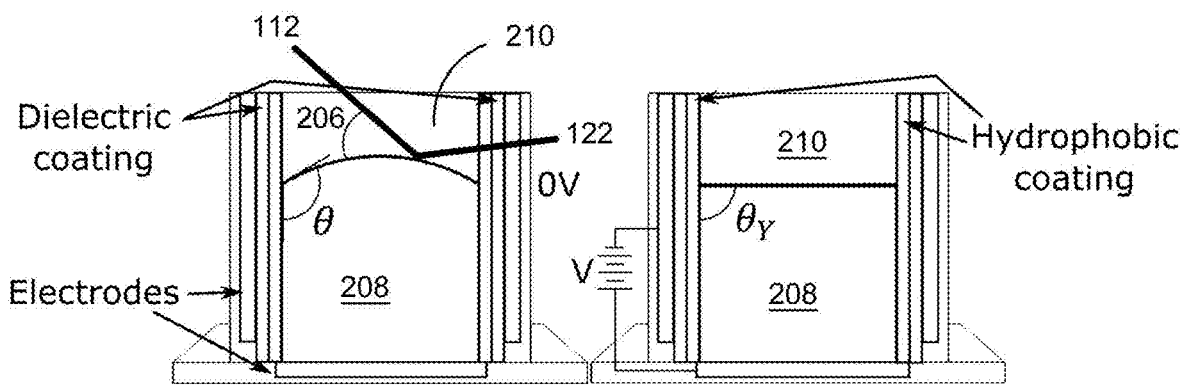
FIGS. 3A and 3B are schematic side views of the optical shutter of FIG. 2 illustrating cell structure and the effect of applied voltage on droplet shape.

FIGS. 3A and 3B are schematic side cutaway views of a shutter 120, illustrating the process of applying voltage and the effect on liquid-liquid interface shape. In FIG. 3A with no voltage applied, liquid-liquid interface 220 is at its most convex. In FIG. 3B with voltage applied, liquid-liquid interface 220 flattens out. Electrodes apply voltage to the liquids and dielectric coatings insulate the fluids. Generally diameters would be in the range of 100 microns to 10 mm. Heights would be about 1-10 mm.

Figure 4A:
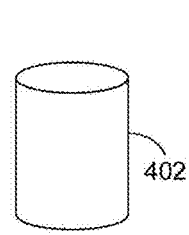
FIG. 4A-F are schematic side views illustrating the fabrication process for optical shutters according to the present invention.
Figure 4D:
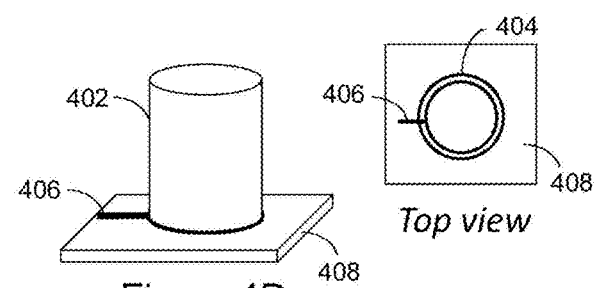
Figure 4B:
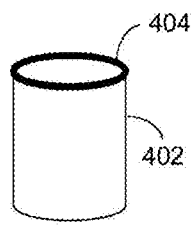
Figure 4E:
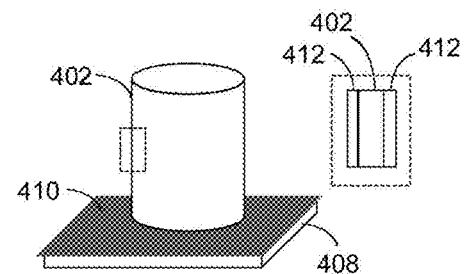
Figure 4C:
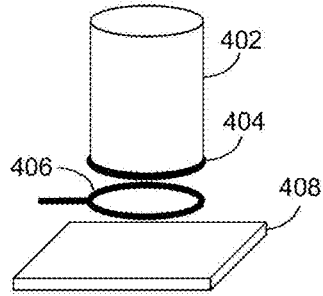

The fabrication process for liquid shutter 120 is illustrated in FIGS. 4A-F. FIG. 4A shows a glass capillary tube 402. In FIG. 4B, a glass frit solution 404 is placed on the rim of glass tube 402 and baked at 400° C. In FIG. 4C, a platinum wire is annealed and shaped in the form of a loop and serves as base electrode 406. Base electrode 406 is aligned between glass frit 404 and dielectric (in this case glass) substrate 408 underneath glass tube 402, with glass frit 404 facing down toward substrate 408. In FIG. 4D tube 402 is clamped down to substrate 408 and the fixture is cured at 550° C. to allow the frit to bond the glass pieces together, resulting in a hermetic seal between tube 402 and base 408. The inset shows a top view of the device at this point.

In FIG. 4E, glass tube 402 is cleaned and substrate 408 is masked with Kapton tape 410 outside the tube and a Teflon plug inside the tube (not shown). The sides of tube 402 are sputter-coated with indium zinc oxide (IZO) 412 to form a continuous film from the inside to the outside of tube 402 as shown in the inset. IZO, an optically transparent conductor, is sputtered onto the sample at an argon pressure of 5 mTorr and power of 120 W to achieve a deposition thickness of 300 nm. The mean free path of the sputtered IZO in the argon at this pressure is an order of magnitude shorter than the distance between target and substrate, enabling diffuse sputtering and a conformal coating from inside to outside of the tube.

Figure 4F:
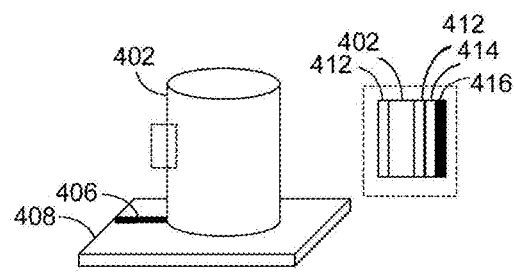

In FIG. 4F, Parylene C 414 is deposited in a vapor-phase, low-vacuum system by VSI Parylene to a thickness of 0.93 μm. The samples are then dip-coated in a 1:20 solution 416 of Dupont's Teflon AF 1600: Fluorinert FC-40 for the 100 nm hydrophobic coating. To cure the Teflon 416 above its glass transition temperature of 165° C., the samples are heated in an oven at 120° C. for 10 min and then 170° C. for 20 min. The inset shows the thin film layers on the device.

Figure 5A:
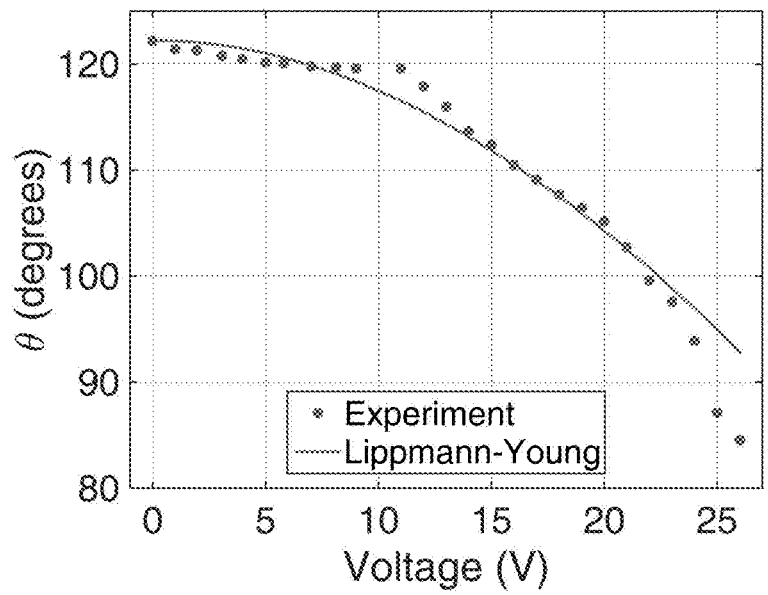
FIGS. 5A and 5B are plots showing experimental results of the system of FIG. 1.
Figure 5B:
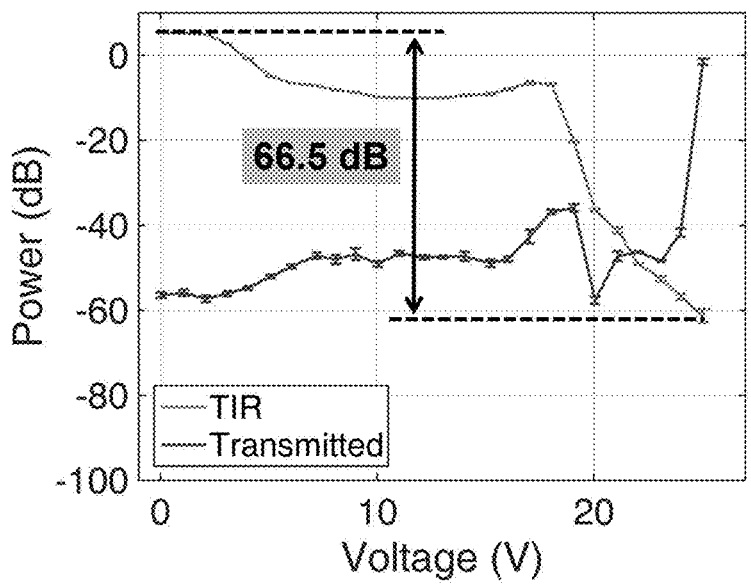

FIGS. 5A and 5B are plots showing experimental results from shutter system 100 of FIG. 1. FIG. 5A illustrates the contact angle 206 vs. applied voltage. Contact angle 206 of liquid interface 220 was characterized by analyzing photographs of the device as a function of applied voltage. The resulting curvature of the liquid interface (dotted line) can be fit to the Lippmann-Young equation (solid line). Total internal reflection occurs at angles θ above about 105°, meaning an angle of incidence of the incident beam 112 (relative to the liquid normal) that exceeds 68 degrees, the critical angle. Both reflected beam 122 and transmitted beam 124 exhibit relatively small changes in optical power until the applied voltage exceeds ~18 V. As the device enters the non-TIR state, the reflected beam power drops sharply, followed by a rise in the transmitted power as the beam becomes aligned to the spatial filter system. The reflected beam power remains high until the ~18 V transition as some of the incident beam is internally reflected at this interval. However, the two spatial filter systems in the transmitted branch require very specific alignment to receive significant power, and it is not until the curvature has approached −45 mm radius that significant power is detected.

Figure 6:
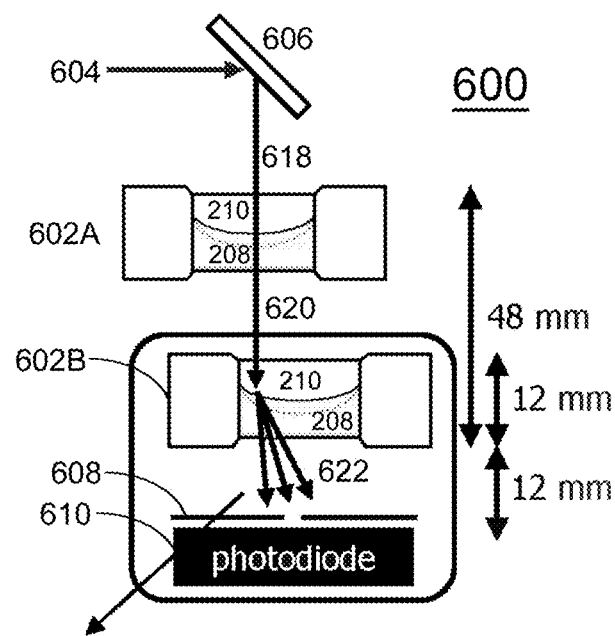
FIG. 6 is a front cutaway schematic diagram of a prism-based liquid shutter according to the present invention.
Figure 7:
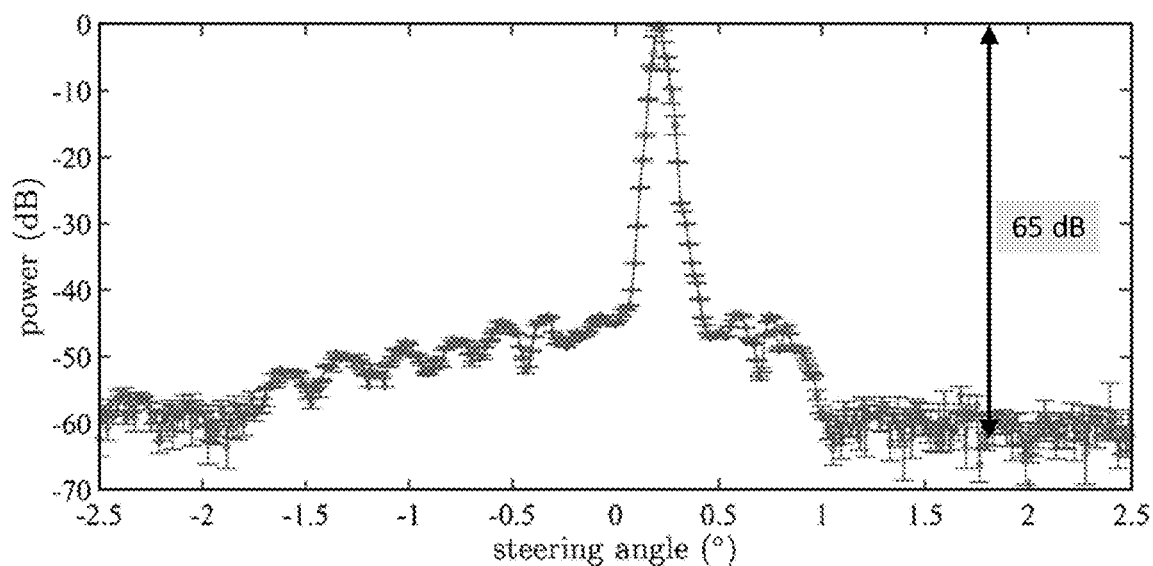
FIG. 7 is a plot illustrating the performance of the shutter of FIG. 6.

FIG. 6 is a front cutaway schematic diagram of a prism-based liquid shutter 600 according to the present invention. FIG. 7 is a plot illustrating the performance of the shutter of FIG. 6.

Prism-based liquid optical shutter 600 uses two pressure-driven lenses 602 that are offset from each other horizontally. The first lens 602A focuses light 620 on the edge of the second lens 602B, which acts like a prism. The first lens can be used to control the output 622 spot size and divergence. As an alternative, electrowetting cells 120 such as those described above can be used.

While the total internal reflection shutter of FIG. 1 works well, it presents unique challenges for integration into a system, due to the angles of the input and output beams. For some setups, there are advantages to this alternate geometry, based on an adaptive prism. Input light 604 is guided into first lens 602A, for example by mirror 606. First lens 602A focuses light on the edge of second lens 602B, which acts like a prism. In addition, first lens 602A can be used to control the output spot size and divergence. After second lens 602B the beam 622 is transmitted or rejected, for example by a micron-size pinhole 608, followed by a photodiode 610. Using a 50-micron pinhole and a 650 nm laser, we achieved a 60 dB rejection ratio. The membrane in the pressure-driven lens limits the rejection ratio. With a tighter 20-micron pinhole, we achieved a 65 dB rejection ratio (see FIG. 7). By changing the wavelength to 780 nm, relevant for atomic clocks, and using an electrowetting-based prism rather than the two offset pressure-driven lenses, the rejection ratio can be increased to above 70 dB. The results represent three orders of magnitude improvement over state-of-the-art.

Figure 8A:
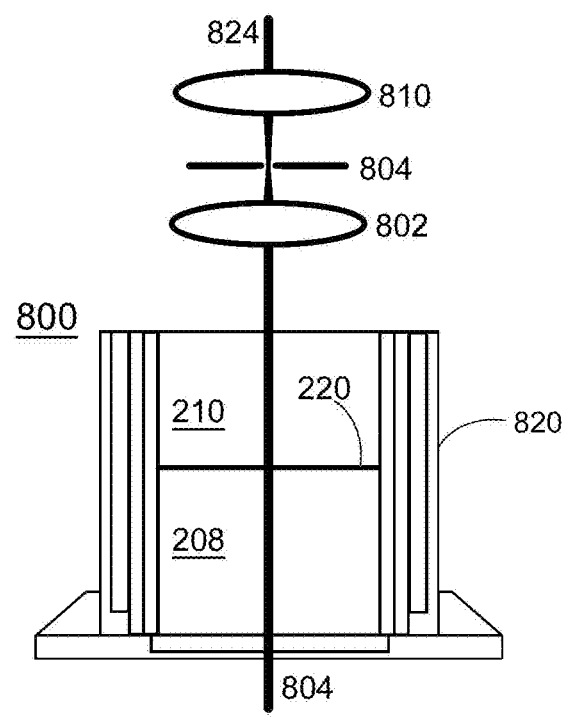
FIGS. 8A and 8B are side cutaway views showing a third shutter embodiment according to the present invention.
Figure 8B:
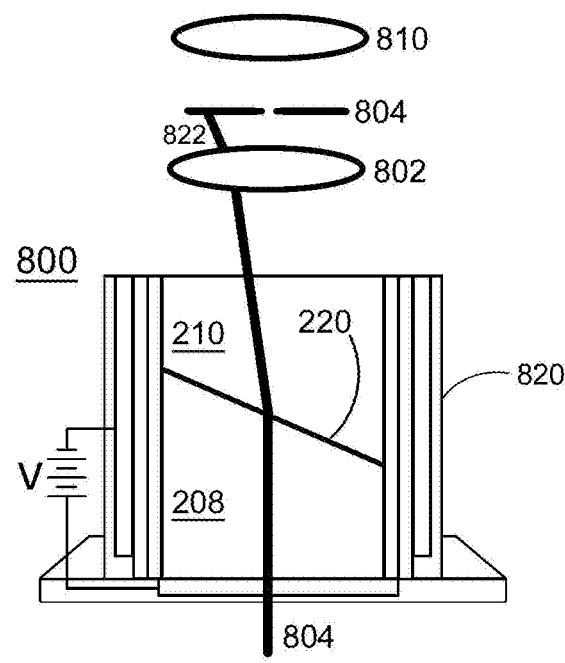

FIGS. 8A and 8B are side cutaway views showing a third shutter embodiment 800. In FIG. 8A the shutter is on and in FIG. 8B the shutter is off. This embodiment of shutter 800 is based on an electrowetting prism 820, filled with water 208 and oil 210, 2 mm in diameter and 5 mm high. Light 804 is incident from the bottom. Prism 820 is followed by lens 802 that amplifies the steering, a spatial filter 804 which allows light through only when the "on" angle is achieved, and a collimating lens 810. When the water-oil interface 220 is flat as in FIG. 8A, light passes through device 820 and aperture 804 as output beam 824, and the switch is in transmission mode ("on"). When switch 800 is off, prism 820 is actuated and deflects light 804 away from aperture 804. Those skilled in the art will appreciate that a number of different geometries would work to form shutter 800.

While the exemplary preferred embodiments of the present invention are described herein with particularity, those skilled in the art will appreciate various changes, additions, and applications other than those specifically mentioned, which are within the spirit of this invention. For example, the ultrasmooth, angstrom-level surface roughness at the liquid-liquid interface gives the device design the potential for higher extinction ratios if the secondary reflections and sidewall interactions can be avoided. Future designs could mitigate the effects of secondary reflections and scattering by using anti-reflection coatings. Scattering effects can be mitigated with new geometries to avoid interaction with solid interfaces such as the coated sidewalls. Furthermore, existing electrowetting prism designs can further reduce the effects of secondary reflections and scattering by altogether avoiding interaction with curved liquid-liquid interfaces, instead biasing the TIR state on a flat, angled liquid interface. This has the potential to further increase the extinction ratio. Future system response time may also benefit from biasing the device operation around the transition point of total internal reflection and transmission, taking advantage of the full extinction ratio while reducing necessary changes in contact angle.

What is claimed is:

1. An optical shutter comprising:
a first liquid lens having an optical axis;
a second liquid lens having an optical axis, wherein the optical axis of the second liquid lens is offset from the optical axis of the first liquid lens;
wherein the second liquid lens is spaced apart from the first liquid lens such that there is an air gap between the first liquid lens and the second liquid lens;
optical apparatus for shining an input beam of light onto the first liquid lens; and
control apparatus for controlling the focal length of each liquid lens;
wherein the first liquid lens is configured to focus light on the second liquid lens, away from the optical axis of the second lens and the second liquid lens is configured to act as a prism by changing a tilt of a liquid surface interface within the second lens and thus steering the focused light;
wherein the first liquid lens and the second liquid lens are mechanically fixed in place while the optical shutter is in use; and
wherein the optical shutter is configured to accomplish an extinction ratio of 60 dB or higher.

2. The optical shutter of claim 1 wherein the first and second liquid lenses are pressure driven lenses.

3. The optical shutter of claim 1 wherein the first and second liquid lenses are electrowetting cells.

4. The optical shutter of claim 1 further comprising optics for transmitting or rejecting output light from the second lens based upon output light angle.

5. The optical shutter of claim 1 configured to achieve extinction ratios greater than 65 dB.

6. The optical shutter of claim 1 further comprising a barrier configured to transmit or reject output light from the second lens based upon output light angle.

7. The optical shutter of claim 6 wherein the barrier includes a pinhole configured to selectively transmit light.

8. The optical shutter of claim 7 wherein the pinhole is on the order of 50 microns or less.

9. The optical shutter of claim 8 wherein the pinhole is on the order of 20 microns or less.

10. The optical shutter of claim 6 wherein the input beam of light is on the order of 650 nm.

11. The optical shutter of claim 6 wherein the input beam of light is on the order of 780 nm.

12. The optical shutter of claim 6 configured to achieve extinction ratios greater than 65 dB.

13. The optical shutter of claim 12 configured to achieve extinction ratios greater than 70 dB.

* * * * *